[11] 3,862,830
[45] Jan. 28, 1975

Stern

[54] METHOD OF FORMING VITREOUS ENCLOSURES FOR LIQUID CRYSTAL CELLS

[75] Inventor: Herman Abraham Stern, Somerville, N.J.

[73] Assignee: RCA Corporation, New York, N.Y.

[22] Filed: July 18, 1973

[21] Appl. No.: 380,387

[52] U.S. Cl............................ 65/58, 65/43, 206/328
[51] Int. Cl.............................................. C03b 23/24
[58] Field of Search .................. 65/43, 58; 206/328

[56] References Cited
UNITED STATES PATENTS 3,778,126   12/1973   Wilson .................................. 316/20
3,798,014   3/1974   Bondarev et al........................ 65/33

Primary Examiner—Arthur D. Kellogg
Attorney, Agent, or Firm—H. Christoffersen; M. Y. Epstein

[57]   ABSTRACT

To provide spacer shims between two glass substrates of a liquid crystal cell, small bodies of a devitrifiable material, e.g., glass, are silk-screened onto one of the substrates and fired in place. To provide a mechanically strong and hermetic seal between the two substrates, a bead of a vitreous material, e.g., glass in silk screened along the edges of one of the substrates and heated to at least partially fuse it in place. The substrates are pressed together and heated to resoften the vitreous bead for sealing together the substrates.

5 Claims, 5 Drawing Figures

PATENTED JAN 28 1975  3,862,830
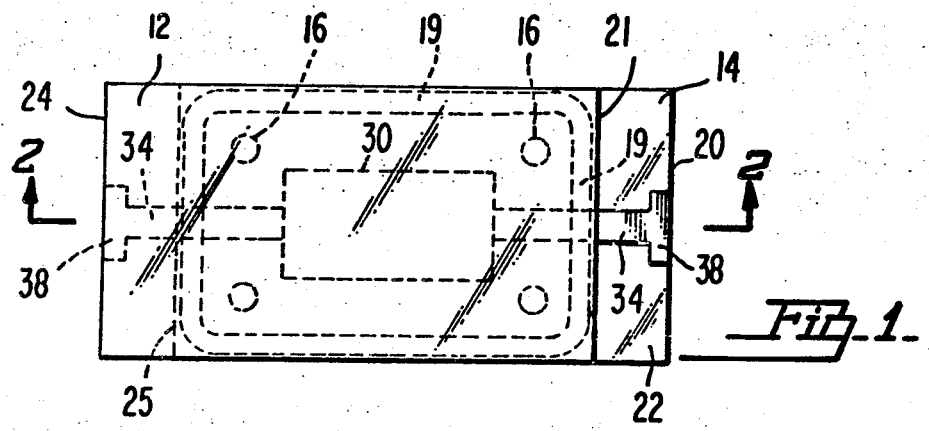
Fig. 1.
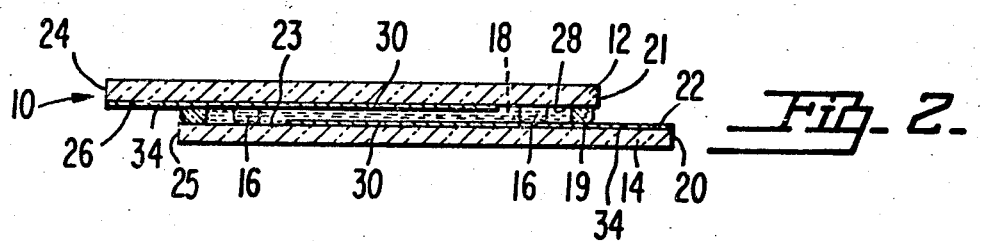
Fig. 2.
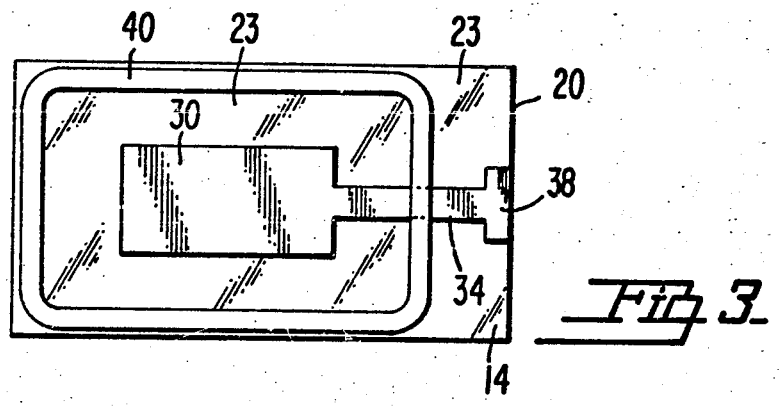
Fig. 3.
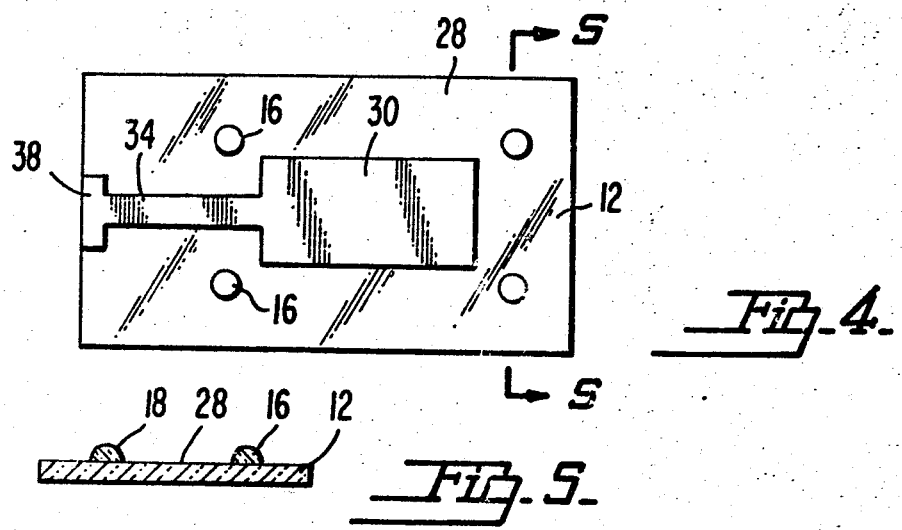
Fig. 4.
Fig. 5.

METHOD OF FORMING VITREOUS ENCLOSURES FOR LIQUID CRYSTAL CELLS

This invention relates to liquid crystal cells, and particularly to the fabrication of the enclosures of such cells.

In one type of liquid crystal cell, the enclosure comprises a pair of flat substrates sealed together in oppositely disposed, spaced apart relation. The liquid crystal material is disposed between the substrates, and the seal, of glass, is disposed along the edges of the two substrates and therebetween.

The spacing between the substrates is generally quite small, being in the order of 1 mil (about 25 micrometers) and less, and is generally quite critical with respect to the proper operation of the cells. One method heretofore used to control the substrate spacing is the use of tiny spacers, e.g., of mica, disposed between the two substrates. A problem with this method is that the spacers, of necessarily small size, are somewhat difficult to place accurately on the substrate, and frequently become displaced during the fabrication process.

Another means heretofore used to control the substrate spacing is the seal itself. Thus, in the fabrication of the cell, a bead of devitrifiable glass is silk screened onto one of the substrates, the amount of glass in the bead and the composition thereof being carefully controlled, and the two substrates are sealed together at a given temperature and with a preselected amount of clamping pressure. Using such a controlled process, the glass bead, of preselected height, is compressed a preselected amount, and the bead, which hermetically seals together the two substrates, also controls the spacing therebetween. A difficulty with this method, however, is that it gives rise to various problems when it is attempted to provide devices having especially small substrate spacings, e.g., less than 1 mil. For example, in order to provide a mechanically strong and hermetic seal, it is found necessary to use at least a minimum amount of glass per unit length of the bead. This minimum quantity of glass, however, has proven to be incompressible to the desired small bead height. That is, by providing the quantity of glass in the bead found necessary for proper sealing together of the two substrates, the minimum spacing that can be provided is somewhat greater than is sometimes desired. Thus, a need exists for satisfying both requirements; namely, small spacings and mechanically and hermetically sound seals.

IN THE DRAWINGS

FIG. 1 is a front view of a liquid crystal cell made according to the instant invention.

FIG. 2 is a cross-section of the cell taken along line 2—2 of FIG. 1.

FIGS. 3 and 4 are front views of each of the substrates of the cell prior to the final assembly thereof.

FIG. 5 is a cross-sectional view taken along line 5—5 of FIG. 4.

With reference to FIGS. 1 and 2, a liquid crystal cell 10 is shown. The cell 10 comprises an enclosure including a pair of oppositely disposed substrates 12 and 14 of an insulating material, usually glass, maintained in spaced apart relation by means of a number of small spacer members of shims 16 of a devitrified material, e.g., ceramic and preferably glass, disposed slightly inwardly of the edges of the substrate 12. Sandwiched between the substrates 12 and 14 is a liquid crystal material 18 of any of the various known types. The spacing between the substrates is generally in the order of between ½ and 1 mil (between about 13 and about 25 micrometers). An hermetic seal is provided by means of a fused glass joint 19 disposed between the substrates along the edges of the substrates.

As shown, an edge 20 of the substrate 14 extends beyond the edge 21 of the substrate 12 thereby exposing a portion 22 of the inside surface 23 of the substrate 14, and an edge 24 of the substrate 12 extends beyond the edge 25 of the substrate 14 thereby exposing a portion 26 of the inside surface 28 of the substrate 12.

Disposed on the inside surface 28 and 23 of each substrate 12 and 14, respectively, is a rectangular conductive layer or electrode 30, the two electrodes being in registry with one another. The electrodes can be of various materials normally used in such cells, such as aluminum, tin oxide, indium oxide, or the like. A conductive path 34 is disposed on the inside surface 23 and 28 of each substrate 12 and 14, each path 34 extending between the electrode 30 and a conductive terminal pad 38 on the exposed surface portions 22 and 26 of the two substrates.

The paths 34 extend beneath the glass joint 19. Preferably, the paths 34 are of the same material as the electrodes 30, and have such a small thickness (equal to that of the electrode 30), in the order of 0.3 micrometer, as not to provide any problems with respect to hermetically sealing the cell, as described hereinafter.

In the operation of the device, a voltage is applied between the two terminal pads 38 by means of suitable terminal means, not shown, whereby a voltage is impressed between the two electrodes 30. In known fashion the voltage between the electrodes 30 affects the light transmitting characteristics of the liquid crystal material 18 between the electrodes.

The fabrication of the cell 10 is as follows.

Starting with the two substrates 12 and 14, generally of glass or some other suitable insulating material, the inside surfaces 23 and 28 thereof are coated by known means with a layer of a material, e.g., indium oxide, stannous oxide, aluminum, chromium, or the like, of which the electrodes 30 and the metal paths are to be formed. Thereafter, the coated layers are defined by known photolithographic techniques to provide these electrodes and metal paths.

Using known techniques, such as printing, painting, and preferably silk screening, a bead 40 (FIG. 3) of a fusible material, e.g., glass, is disposed on the inside surface 23 of the substrate 14 closely along three edges thereof but spaced inwardly of the edge 20. In this embodiment, the bead 40 does not serve to control the spacing between the substrates 12 and 14, but serves solely to provide a mechanically strong and hermetic seal therebetween. To this end, a vitreous material is used which is initially fusion sealed to the substrate 14 to maintain it in place thereon and which is later softened and refused to form the substrate seal. Various sealing glasses are known which can be used. For example, a glass frit comprising glass particles of a lead-borosilicate compound in a liquid vehicle of an organic solvent and an organic binder is used which is silk screened onto the substrate and then fired to fusion seal the bead to the glass.

In one embodiment, for example, a glass frit sold by Owens Illinois Glass Company, and known as SG67(OI-01158) frit is used, the glass frit slurry or ink comprising, by weight, 73.4% glass, 4.2% ethyl cellulose binder, and 22.4% butyl carbitol solvent. A "silk screen" having a 120 mesh stainless steel screen is used. After being deposited, the bead 40 is fired at a temperature in the order of 450°C to fusion seal it to the substrate 14, the fired bead 40 having a height of 2.5 mils (about 62 micrometers) and a base width of 35 mils (about 875 micrometers). The sealing of the bead 40 to the substrate 14 is important in that it allows further handling of the substrate without danger of misplacement of the bead.

The bead 40 crosses the conductive path 34 on the substrate 14, but owing to the thinness of the path 34, there is little likelihood of spaces or voids being left between the fused bead 40 and the substrate at the crossover point.

Similarly, the various spacer members or shims 16 are silk-screened in proper place on the inside surface 28 of the substrate 12 (FIGS. 4 and 5). Unlike the material of the bead 40, which is to be later softened and refused, the shims 16 are formed of a devitrifiable material, preferably glass, so that once fired in place, the dimensions thereof do not change upon the subsequent substrate sealing operation. The devitrifiable glass can comprise, for example, a vitreous material, such as the aforementioned leadborosilicate glass, having a crystallizing agent therein. Other devitrifiable glass compositions which can be used are commercially available; the particular compositions thereof, however, generally being proprietary with the vendors and not being published.

In one embodiment, for example, a glass frit sold by Corning Glass Works, and known as 7575 devitrifying solder glass is used, the glass frit comprising, by weight, 73.4% glass, 4.2% ethyl cellulose binder, and 22.4% butyl carbitol solvent. A "silk screen" having a 120 mesh stainless screen is used. After firing at a temperature in the order of 450°C, the shims have a generally rounded, conical shape with a height of 0.9 mil (about 23 micrometers) plus or minus 0.2 mil, (about 5 micrometers) and a base diameter of 60 mils (about 1,500 micrometers). The height of the shims 16 is somewhat less than that of the bead 40 on the substrate 14 (FIG. 3). The firing of the shims determines the height thereof and thus the spacing between the substrates, as described hereinafter, and also fixes or bonds the shims 16 to the substrate 12. This is important in that it prevents misplacement of the shims during subsequent handling of the substrate 12.

While the shims 16 and the bead 40 are described as being disposed on different substrates, both can be disposed on the same substrate.

The two substrates 12 and 14 are then disposed in face-to-face relation and in such alignment that the electrodes 30 on the two substrates are properly aligned with one another, and the bead 40 is disposed just inwardly of edges of and in contact with the inside surface 28 of the substrate 12.

Thereafter, suitable clamping means or weights are provided to apply compressive pressure between the two substrates 12 and 14, and the cell is exposed to a temperature in the order of 520°C for a time sufficient to soften the bead 40. As previously noted, the spacer shims 16 are not softened during this heating procedure. The compressive pressure forces the two substrates 12 and 14 towards one another until further movement is prevented by contact of the substrate 14 with the shims 16 on the substrate 12. The movement of the substrates 12 and 14 towards one another causes lateral spreading of the softened bead 40. Preferably, the softening of the bead 40 is not so great as to cause or allow any more lateral movement thereof than is necessary to contain the mass thereof between the two substrates and in contact therewith. Upon cooling, the bead 40 forms the joint 19 (FIG. 1) between the two substrates 12 and 14.

An advantage of the instant invention, in comparison with the prior art method in which the sealing bead is used to control the spacing between the substrates, is that the amount and composition of the glass used in the sealing bead is selected independently of the spacing desired for the substrates. That is, in the prior art, a devitrifiable glass was used which, as previously mentioned, had to be compressed to the desired substrate spacing. This, as noted, gave rise to certain problems. By using a vitreous glass sealing bead in accordance with this invention, which can be softened to a low viscosity, however, the bead can be compressed to substantially any desired thinness while still providing enough glass to properly mechanically and hermetically seal the substrates together. Conversely, by using tiny shims 16 of a devitrifiable material, the shims not serving to seal together the substrates, the shims can readily be made as small as desirable while still attaining a high degree of accuracy.

To complete the cell, known means, not shown, are used to inject the liquid crystal material into the space defined by the substrates 12 and 14 and the joint 19. An example of a suitable process for filling liquid crystal cells is described in U.S. Pat. No. 3,701,368, issued on Oct. 31, 1972.

I claim:
1. A method of fabricating a liquid crystal cell comprising:
   bonding a spacer having a softening point at a first temperature to one of two enclosure members of the cell to be fabricated,
   bonding a bead of a vitreous material having a softening point at a temperature less than that of said first temperature to one of said two members,
   thereafter disposing said two members in enclosure forming relationship with said spacer and said bead disposed therebetween,
   heating said disposed parts to soften said bead at a temperature less than said first temperature,
   while said bead is soft, pressing said members together to compress said bead therebetween until further compression is prevented by contact of said spacer with the other of said two members, and
   cooling said bead to provide a sealed joint between said two members.
2. The method of claim 1 in which said bead, as disposed on said one substrate, has a height greater than that of said spacer.
3. The method of claim 2 in which the mass of material in said bead is substantially greater than that in said spacer.
4. A method of fabricating a liquid crystal cell comprising:

disposing a spacer of a devitrifiable material on one of two enclosure members of the cell to be fabricated, thereafter devitrifying said spacer and bonding it to said one member, bonding a bead of a vitreous material to one of said two members, thereafter disposing said two members in enclosure forming relationship with said spacer and said bead disposed therebetween, heating said bead to soften it, while said bead is soft, pressing said members together to compress said bead between said members until the spacing therebetween is determined by the contacting of said spacer with both said members, and cooling said bead to provide an hermetic seal between said two members.

5. A method of fabricating a device as in claim 4 wherein said bead, prior to said enclosure forming step, has a height greater than that of said spacer.

* * * * *